United States Patent
Warriner et al.

(10) Patent No.: US 10,002,090 B2
(45) Date of Patent: Jun. 19, 2018

(54) METHOD FOR IMPROVING THE PERFORMANCE OF SYNCHRONOUS SERIAL INTERFACES

(71) Applicant: Microsemi Semiconductor ULC, Kanata (CA)

(72) Inventors: Mark A Warriner, Ottawa (CA); Gabriel Rusaneanu, Ottawa (CA); Wenbao Wang, Ottawa (CA)

(73) Assignee: Microsemi Semiconductor ULC, Kanata, ON (CA)

( * ) Notice: Subject to any disclaimer, the term of this patent is extended or adjusted under 35 U.S.C. 154(b) by 148 days.

(21) Appl. No.: 15/065,925

(22) Filed: Mar. 10, 2016

(65) Prior Publication Data
US 2016/0299861 A1    Oct. 13, 2016

Related U.S. Application Data

(60) Provisional application No. 62/144,440, filed on Apr. 8, 2015.

(51) Int. Cl.
*G06F 13/42* (2006.01)
*G06F 1/00* (2006.01)
*G06F 13/362* (2006.01)

(52) U.S. Cl.
CPC ........ *G06F 13/362* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 2007/0240011 A1* | 10/2007 | Saripalli | ............... | G06F 13/128 713/500 |
| 2013/0179460 A1* | 7/2013 | Acuna | ................... | G06F 17/276 707/758 |
| 2014/0006725 A1* | 1/2014 | Shiomi | ............... | G06F 13/1657 711/149 |

* cited by examiner

*Primary Examiner* — Hyun Nam
(74) *Attorney, Agent, or Firm* — Simon Kahn

(57) ABSTRACT

A slave device for exchanging data with a master device over a serial interface sends data to the master device upon receipt of a command from the master device. A controller responsive to a command byte in a receive register commences transmission of data in the transmit register under the control of a clock signal prior to reception of a complete command.

12 Claims, 2 Drawing Sheets

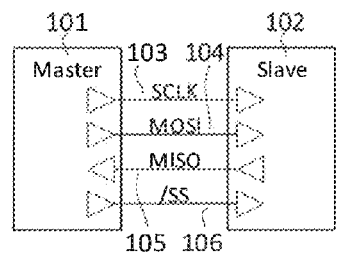
PRIOR ART
Fig. 1
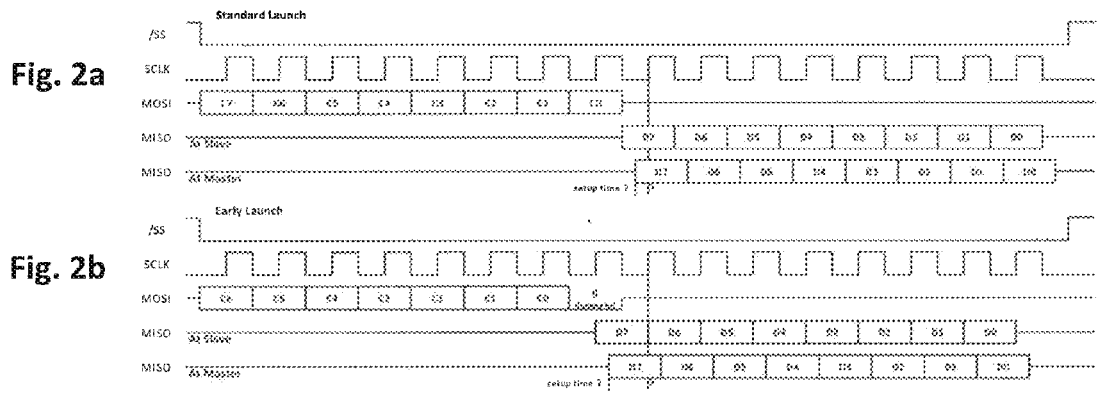
Fig. 2a
Fig. 2b

METHOD FOR IMPROVING THE PERFORMANCE OF SYNCHRONOUS SERIAL INTERFACES

CROSS REFERENCE TO RELATED APPLICATION

This application claims the benefit under 35 USC 119(e) of U.S. provisional application No. 62/144,440, filed Apr. 8, 2015, the contents of which are herein incorporated by reference.

FIELD OF THE INVENTION

This invention relates to synchronous serial interfaces, for example, and more particularly to a method of improving the performance of such interfaces.

BACKGROUND OF THE INVENTION

Low speed synchronous serial interfaces, such as the System Peripheral Interface (SPI) and its numerous variants, are widely used for interfacing microprocessors with peripheral devices, including flash memories, sensors, data conversion devices, timing and synchronization devices, communication devices, audio codecs, and liquid crystal displays.

For some of these applications, it is desired to maximize the bandwidth of data transfers by increasing the clock rate. In a 4-wire SPI interface, this is relatively easy to achieve for master-to-slave transfers, which transmit clock and data in a source synchronous manner. Slave-to-master transfers however transmit clock and data in opposite directions, and thus suffer from the effects of round trip time delay, severely limiting performance.

A known technique to increase clock rate on SPI and similar interfaces involves modification to the master side of the interface, supporting an adjustable data sampling point. While this technique may be effective, it has some disadvantages: It has a high degree of design complexity. System integrators simply adding a new slave device to an existing SPI bus may be resistant to any master side modifications that may risk affecting communications with other devices. The required modifications may not be possible, e.g. when the master is integrated into an existing microprocessor design that does not support these features. Delaying the sampling point at the master requires the host processor to accept the data at a later point in time, which may require further, potentially infeasible system level changes or may impact system performance.

SUMMARY OF THE INVENTION

Embodiments of the invention make a modification to the hardware design of the slave side of the SPI interface and higher-level protocol between the master and slave to advance the launch point for data after receipt of a command from the master. As a result, the interface clock speed can be increased, improving bandwidth beyond what was initially limited by round trip time According to the present invention there is provided a slave device for exchanging data with a master device over a synchronous serial interface, wherein the slave device sends data to the master device upon receipt of a command from the master device, the slave device comprising: a receive shift register for storing incoming commands; a transmit shift register for storing outgoing data; and a controller responsive to a command in the receive register to transmit data in the transmit register under the control of a clock signal, said controller being configured to commence transmission of said data in response to said command prior to complete reception of said command.

Typically, the shift registers will be have a length capable of storing a complete byte, i.e. 8 bits, but one skilled in the art will appreciate that other bit-lengths could be employed, for example, 12 bits or 16 bits.

Embodiments of the invention may offer the several advantages over previously known methods. The hardware changes are confined to the slave side only. The hardware implementation uses efficient standard digital logic and does not require modification to input and output buffers. The device may be implemented in both direct-clocked and sample-clocked designs and maintain backward compatibility with existing SPI masters, at supported clock rates. The device can also co-exist with peer slave devices not supporting the enhancement.

In another aspect the invention provides a master device for receiving data from a slave device over a synchronous serial interface, wherein the slave device sends data to the master device upon receipt of a command from the master device, the master device being configured to send out a command to the slave device wherein a last transmitted bit of the command is a dummy bit containing no useful data.

In yet another aspect the invention provides a method for sending data to a master device from a slave device over a synchronous serial interface, the method comprising: the slave device receiving a command from the master device; and the slave device in response to partial reception of said command transmitting data to the master device prior to complete reception of the command.

BRIEF DESCRIPTION OF THE DRAWINGS

This invention will now be described in more detail, by way of example only, with reference to the accompanying drawings, in which:

FIG. 1 illustrates a prior art serial Peripheral Interface (SPI);

FIGS. 2a and 2b are timing diagrams showing standard launch and early launch respectively in accordance with an embodiment of the invention.

DETAILED DESCRIPTION OF PREFERRED EMBODIMENTS

Figure 3:
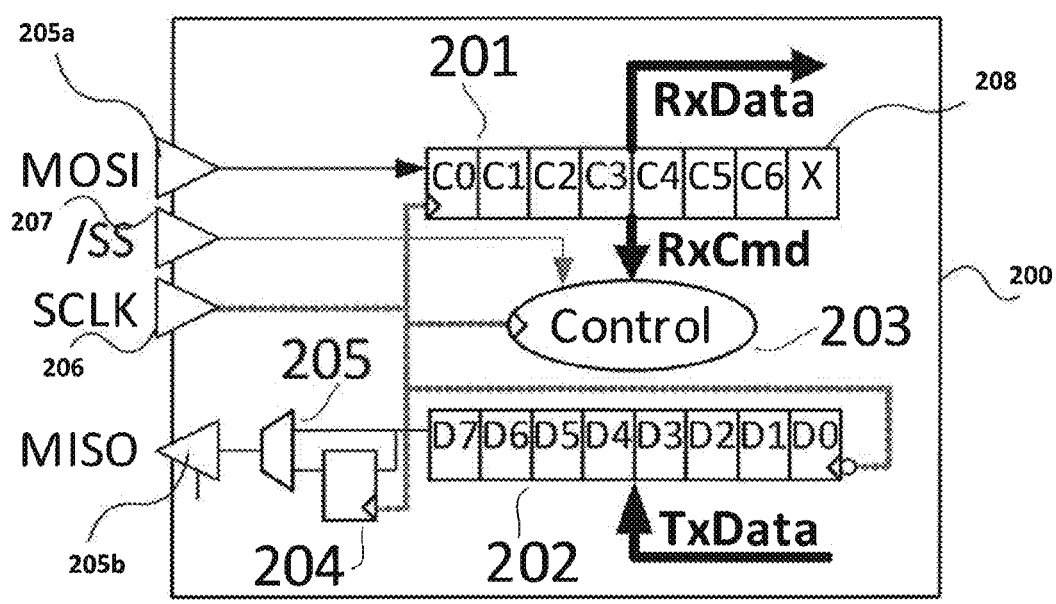
FIG. 3 is a schematic diagram of a modified SPI slave interface with support for standard and early launch in accordance with an embodiment of the invention.

FIG. 1 shows a high level view of a prior art 4-wire Serial Peripheral Interface (SPI). A master device 101 communicates with a slave device 102 using four signals: a clock signal SCLK 103; master output to slave input data signal MOSI 104; master input to slave output data signal MISO (105); and a slave chip select signal /SS 106. In the case of multiple slave devices, a separate /SS line is typically used for each slave, although target addressing schemes also exist. Many variants of SPI and other similar synchronous serial interfaces exist.

FIGS. 2a and 2b show a timing diagram of the interface, with standard launch and with early launch in accordance with an embodiment of the invention. In this example, a one byte command C7-C0 is transferred from master device 101 to the slave device 102 on the MOSI line requesting data from the slave. After receiving the hill command, the slave immediately responds with one byte of data D7-D0. The higher layer protocol could extend this to an arbitrary number of bytes. We assume an operating mode with an initially low clock (clock polarity CPOL=0) and capture on the leading clock edge (clock phase CPHA=0). However, all other CPOL, CPHA combinations are equally valid for the invention.

The round trip delay, which includes the propagation of SCLK from master device 101 to slave device 102 plus the propagation of MISO from slave back to the master reduces the setup time for sampling the MISO signal at the master device. The setup time is the time a signal is stable before it is sampled. Flip flop D pins at the circuit level and clocked input data pins at the device level specify a minimum required setup time in their datasheets. With increasing clock rate, the setup time is eventually reduced to the point where timing failure occurs. With the early launch scheme in accordance with embodiments of the invention, the data is driven from the slave device 102 earlier, one half clock cycle earlier in this example, providing additional setup margin, allowing for higher clock rates, and thus increased interface bandwidth.

With the early launch feature in accordance with the invention, there is insufficient time for the slave to decode the last transmitted bit of the command byte. To overcome this problem, the higher layer protocol is modified to change the last bit into a dummy zero bit, which is ignored by the slave device. The host system software need only shift the command left by one bit, with no changes required to the typical master hardware design. If the remaining 6 bits of command is insufficient, multiple command bytes could be used for some or all commands.

FIG. 3 shows a schematic diagram for the modified SPI slave device 200 supporting both standard launch and early launch in accordance with the invention. The slave device 200 comprises shift registers receive register 201, transmit register 202, flip-flop 204, multiplexer 205, MISO input 205a, MISO output driver 205b, //SS input 207, and SCLK input 208.

Receive data and commands are clocked on the rising edge from MOSI into the receive shift register 201. The transmit data and commands are clocked on the falling edge from the transmit shift register 202 out to MISO output 205b. A controller 203 processes commands and coordinates shift register operation.

Rising edge flip-flop 204 and multiplexer 205 allow selection of the launch edge, with the launch cycle being determined by logic in the controller 203.

In the illustrated example the contents of the shift registers 201, 202 correspond to point indicated by * in FIG. 2b, just before the rising edge of the clock in the last bit of the command byte. At this point, command bits C6-0 have been shifted in and decoded. The receive shift register has deepest bit location 208 containing an unknown value X left over from a previous transaction and thus ignored. Data bit D7 is about to be loaded into flip-flop 204 at the same time as the output driver 205b is enabled.

The launch point can be made configurable. Also, the embodiment wherein the slave device clocks directly from SCLK as in FIG. 3 could launch data on any preceding clock edge, while slave devices using a high speed internal sampling clock could have finer grain control over the launch point. When selecting a launch point, care must be taken not to violate hold time. For a half cycle early launch, hold time is easily guaranteed by the minimum round trip delay.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. The functional blocks or modules illustrated herein may in practice be implemented in hardware or software running on a suitable processor.

The invention claimed is:

1. A slave device for exchanging data with a master device over a synchronous serial interface, wherein the slave device sends data to the master device upon receipt of an incoming command from the master device, the slave device comprising:
a receive shift register comprising successive bit locations terminating in a
deepest bit location, said successive bit locations being operative to store said incoming command in the form of a serial stream of bits wherein a last bit is a dummy bit, and said shift register being responsive to a clock signal to shift said bits serially through said successive bit locations;
a transmit shift register for storing outgoing data; and
a controller responsive to said bits stored in said successive bit locations excluding said deepest bit location to decode said incoming command upon receipt a first portion of said incoming command excluding said last bit and to transmit data bits in the transmit register under the control of said clock signal, said controller being configured to commence serial transmission of said data bits in response to said incoming command prior to complete reception of said last bit of said incoming command.

2. The slave device as claimed in claim 1, wherein said incoming command comprises a single command byte.

3. The slave device as claimed in claim 1, wherein said incoming command comprises multiple bytes.

4. The slave device as claimed in claim 1, wherein said clock signal is defined by cycles, and said controller is configured to commence transmission of said data bits a portion of a cycle prior to the complete reception of said last bit of said incoming command.

5. The slave device as claimed in claim 1, wherein said clock signal is defined by cycles, and said controller is configured to commence transmission of said data bits one half cycle prior to the complete reception of said last bit of said incoming command.

6. A synchronous serial interface comprising:
a master device configured to send out a command in the form of a serial stream of bits wherein a last bit is a dummy bit; and
a slave device for exchanging data with said master device, wherein the slave device sends data to said master device upon receipt of said command from the master device, the slave device comprising:

a receive shift register comprising successive bit locations terminating in a deepest bit location, said successive bit locations being operative to store said command from the master device in the form of a serial stream of bits wherein a last bit is a dummy bit, and said shift register being responsive to a clock signal to shift said bits serially through said successive bit locations;

a transmit shift register for storing outgoing data; and a controller responsive to bits stored in said successive bit locations excluding said deepest bit location to decode said command from the master device upon receipt of a portion of said command from the master device excluding said last bit and to transmit data bits in the transmit register under the control of said clock signal, said controller being configured to commence serial transmission of said data bits in response to said command from the master device prior to complete reception of said last bit of said command from the master device.

7. The synchronous serial interface in claim 6, wherein if a potential command is larger than remaining bits of a command byte, the master device is configured to send out said command as multiple bytes.

8. A method for sending data to a master device from a slave device over a synchronous serial interface, wherein said slave device comprises:

a receive shift register comprising successive bit locations terminating in a deepest bit location, said successive bit locations being operative to store a command received from the master device in the form of a serial stream of bits wherein a last bit is a dummy bit, said shift register being responsive to a clock signal to shift said bits serially through said successive bit locations;

a transmit shift register for storing outgoing data; and a controller responsive to bits stored in said series of bit locations excluding said deepest bit location to decode said command upon receipt of a first portion of said incoming command excluding said last bit;

the method comprising:

the master device sending the command to the slave device in the form of a serial stream of bits wherein a last bit is a dummy bit; and the slave device in response to reception of a first portion of said command excluding said last bit transmitting data to the master device prior to reception of said last bit of said command.

9. A method as claimed in claim 8, wherein the command comprises a single byte.

10. A method as claimed in claim 8, wherein said command comprises multiple bytes.

11. A method as claimed in claim 8, wherein data bits within said data are transmitted under the control of a clock signal defined by cycles, and said slave device commences transmission of said data bits a portion of a cycle prior to the reception of said last bit of said command.

12. A method as claimed in claim 8, wherein data bits within said data are transmitted under the control of a clock signal defined by cycles, and said slave device commences transmission of said data bits one half cycle prior to the complete reception of said last bit of said command.

\* \* \* \* \*